United States Patent [19]

Robinson et al.

[11] 4,410,652

[45] Oct. 18, 1983

[54] REACTION PRODUCTS USEFUL FOR IMPROVING THE WETFASTNESS OF DIRECT AND REACTIVE DYES ON CELLULOSIC SUBSTRATES

[75] Inventors: Tibor Robinson, Birsfelden; Walter Knobel, Pratteln; Bruno Kissling, Riehen, all of Switzerland

[73] Assignee: Sandoz Ltd., Basel, Switzerland

[21] Appl. No.: 347,138

[22] Filed: Feb. 9, 1982

Related U.S. Application Data

[63] Continuation-in-part of Ser. No. 235,301, Feb. 13, 1981, abandoned.

[30] Foreign Application Priority Data

| Feb. 22, 1980 | [CH] | Switzerland | 1436/80 |
| Sep. 24, 1980 | [DE] | Fed. Rep. of Germany | 3035942 |
| Sep. 24, 1980 | [DE] | Fed. Rep. of Germany | 3035893 |
| Nov. 26, 1980 | [DE] | Fed. Rep. of Germany | 3044441 |

[51] Int. Cl.³ .......................................... C08L 61/32
[52] U.S. Cl. .................................. 524/195; 524/598; 525/509; 8/496; 8/551; 8/543
[58] Field of Search ................ 525/509; 524/195, 598

[56] References Cited

U.S. PATENT DOCUMENTS

| 2,649,354 | 8/1953 | Hemmi et al. | 8/551 |
| 2,769,797 | 11/1955 | Suen et al. | 525/509 |
| 2,786,824 | 3/1957 | Keim | 525/509 |
| 3,141,728 | 7/1964 | Bockmann et al. | 8/551 |
| 3,873,266 | 3/1975 | Hofer et al. | 8/551 |
| 4,247,476 | 1/1981 | Haase et al. | 8/639 |

FOREIGN PATENT DOCUMENTS

| 564451 | 5/1960 | Belgium . | |
| 907164 | 8/1949 | Fed. Rep. of Germany . | |
| 41-14629 | 8/1966 | Japan | 8/551 |
| 574536 | 4/1976 | Switzerland | 8/551 |
| 537009 | 6/1941 | United Kingdom . | |
| 755520 | 8/1956 | United Kingdom | 8/551 |
| 952680 | 3/1964 | United Kingdom . | |
| 1031534 | 6/1966 | United Kingdom . | |

*Primary Examiner*—Maria Parrish Tungol
*Attorney, Agent, or Firm*—Gerald D. Sharkin; Richard E. Vila; Thomas C. Doyle

[57] ABSTRACT

The wet fastness of direct dyes on cellulose substrates is improved by after-treatment with the reaction product of an amine with cyanamide, dicyanodiamide, guanidine or biguanidine which is further reacted with an N-methylol resin precursor, and heat curing in the presence of a catalyst. The unfixed portion of reactive dyes substantive to cellulose may also be given improved wet fastness by this treatment, so that washing to remove unfixed reactive dye may not be necessary.

26 Claims, No Drawings

REACTION PRODUCTS USEFUL FOR IMPROVING THE WETFASTNESS OF DIRECT AND REACTIVE DYES ON CELLULOSIC SUBSTRATES

This present application is a continuation-in-part application of our copending application Ser. No. 235,301 filed Feb. 13, 1981 and now abandoned.

This invention relates to a textile treatment process for improving the wet fastness of direct and reactive dyes on cellulose-containing substrates.

Dyeings and printings with direct dyestuffs often show inadequate wash fastness. The dyestuff which is bound to the surface of the cellulose fibres is largely removed from the fibres by repeated washings, and bleeding of the dyestuff into the wash liquid can cause partial readsorption on to undyed cellulose material.

There have been many attempts to overcome these disadvantages, for example by complexing on the fibre with metal salts, formation of the dyestuff on the fibre, treatment of the dyestuff and/or the fibre with formaldehyde, impregnation with artificial resins and after-treatment with cationic auxiliaries. The use of cationic after-treatment auxiliaries has proved particularly effective.

The disadvantage of all previously used methods is that although improved fastness is indeed attained, the results are only temporary. Even in the case of cationic after-treatment, the auxiliary is removed from the fibres by repeated washings, particularly under alkaline conditions and at high temperatures such as 50°–100° C. The loss of the cationic auxiliary means that the dyeing loses its improved wet fastness again.

Reactive dyes attempt to solve the problem of wash fastness by the formation of a chemical bond between the dye molecule and the cellulose fibre. However, a disadvantage of the use of reactive dyes is that although the dyestuff which is chemically bound to the fibre has excellent wash fastness, the goods must be washed thoroughly after dyeing in order to remove residual unfixed dyestuff, which has poor wash fastness. Furthermore the fixed reactive dye itself may have inadequate fastness to agents such as chlorine or perborate.

The present invention provides a process for improving the wet-fastness properties of a direct or reactive dyestuff on a substrate comprising cellulose fibres by applying to the dyed or printed substrate the reaction product of (A) the product of reacting a mono- or polyfunctional primary or secondary amine with cyanamide, dicyanodiamide, guanidine or bi-guanidine; or ammonia with cyanamide or di-cyanodiamide, said product containing reactive hydrogen atoms bound to nitrogen, and (B) an N-methylol derivative of a urea, melamine, guanamine, triazinone, urone, carbamate or acid amide in the presence of (C) a catalyst for the crosslinking of N-methylol compounds of the type (B) above, and subsequently carrying out a heat-curing step.

The invention further provides, as a new composition of matter, the water-soluble product of reacting in aqueous solution components (A) and (B), preferably in the presence of catalyst C.

Intermediate product (A) is preferably the reaction product of a monofunctional amine of formula Ia $$RRNH \quad \text{Ia}$$

or a polyfunctional amine of formula Ib $$RRN-(Z-X-_nZ)-NRR \quad \text{Ib}$$

in which each
R independently is hydrogen or a $C_{1-10}$ alkyl group unsubstituted or monosubstituted with hydroxy, $C_{1-4}$alkoxy or cyano,
n is a number from 0 to 100
Z, or each Z independently when n>0, is $C_{1-4}$alkylene or hydroxyalkylene
and X, or each X independently when n>1, is —O—, —S— or —NR— where R is as defined above,
provided that the amine of formula Ib contains at least one reactive —NH— or —NH$_2$ group, with cyanamide, dicyanodiamide (DCDA) or guanidine.

More preferably, intermediate product (A) is the reaction product of a polyfunctional amine of formula Ib with cyanamide, DCDA or guanidine. In the amines of formula Ib, R is preferably hydrogen or $C_{1-4}$alkyl or hydroxyalkyl, more preferably each R is hydrogen. n is preferably a number from 0 to 30, which may be non-integral representing an average value. More preferably n is an integer from 1 to 6. Z is preferably a 1,2-ethylene, 1,3-propylene or 1,3-(2-hydroxypropylene)group, X is preferably —NR—, most preferably 13 NH—.

Particularly preferred amines are diethylene triamine, triethylene tetramine and higher polyethylene polyamines, polypropylene polyamines, or poly(hydroxypropylene) polyamines containing up to 8, preferably up to 6, N atoms.

In the reaction with cyanamide, DCDA, guanidine or biguanidine, the amines may be in free base or in salt form, for example in the carbonate form, and mixtures of amines may be used. Where ammonia is a reactant this is preferably used in the salt form. Preferred reagents are guanidine and DCDA, particularly DCDA and particularly preferred intermediate products (A) are the reaction products of diethylene triamine or triethylenetetramine with DCDA.

Intermediate products (A) are known, and their preparation is described for example in British Pat. No. 657,753 and in U.S. Pat. No. 2,649,354. Suitably the reagents are reacted together in the absence of water at elevated temperatures, optionally in the presence of a non-aqueous solvent. Preferably the reaction is carried out in the absence of solvent at a temperature of 140°–160° C., and where the reagent is an amine, ammonia is evolved. The reagents are preferably reacted in a molar ratio of 0.1 to 1 mole of cyanamide, DCDA, guanidine or biguanidine per mole of reactive —NH or —NH$_2$ groups, and when DCDA is reacted with a polyalkylene polyamine, the molar ratio of the reactants is more preferably from 2:1 to 1:2, particularly about 1:1.

The products (A) are near-colourless viscous liquids or solids which are basic in character, water-soluble either in the free base or salt form, and contain reactive hydrogen atoms bonded to nitrogen. The products are preferably miscible with water in all proportions.

Before being reacted with intermediate products (B) it is preferred that product (A) be neutralised to a pH value of 7-8, e.g. by addition of inorganic or organic acids, preferably hydrochloric or sulphuric acids, to an aqueous solution of (A). It may be desirable after neutralisation with acid to concentrate the neutralised solution of (A) before addition to B; for example the product (A) may be converted to a powder by spray drying.

The intermediate products (B) are generally those water-soluble N-methylol compounds which are known as crosslinking agents for cellulose fibres, and are used to impart a crease-resistant finish to cellulose fabrics.

The compounds may contain free N-methylol groups >N—CH$_2$OH, or these may be etherified. Preferred ether derivatives are the lower alkyl ethers having 1 to 4 carbon atoms in the alkyl group.

Examples of suitable N-methylol compounds are listed below:

Urea derivatives
HOCH$_2$—NH.CO.NH.CH$_2$OH      N,N'dimethylolurea

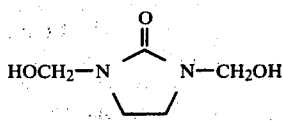   N,N'—dimethylolethyleneurea

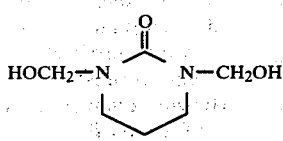   N,N'—dimethylolpropyleneurea

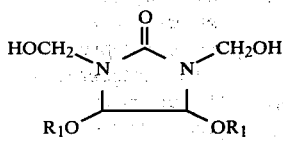   N,N'—dimethylol-4,5-dihydroxy(methoxy)-ethyleneurea
($R_1$ = H or CH$_3$)

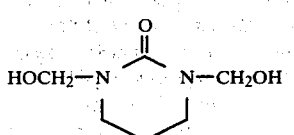   N,N'—dimethylol-5-hydroxypropyleneurea

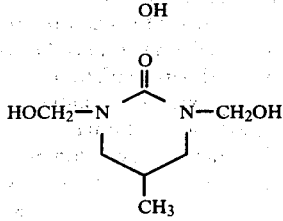   N,N'—dimethylol-5-methylpropyleneurea

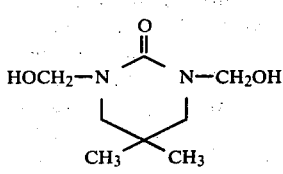   N,N'—dimethylol-5,5-dimethylpropyleneurea

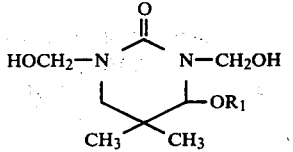   N,N—dimethylol-4-hydroxy(methoxy)-5,5-dimethylpropyleneurea
($R_1$ = H or CH$_3$)

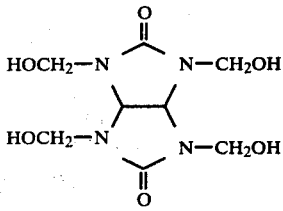   N,N,N',N'—tetramethylolacetylenediurea

Melamine derivatives

| | |
|---|---|
| 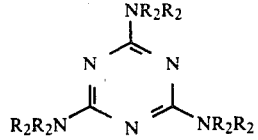 | in which each $R_2$ is —$CH_2OH$ or H, provided that at least one, preferably at least two $R_2$ groups are —$CH_2OH$ |
| Guanamine derivates<br>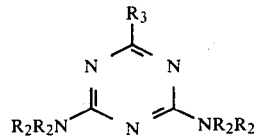 | in which $R_2$ is as above and $R_3$ is $C_{1-12}$ alkyl or $C_{6-12}$ aryl |
| Triazinone derivatives<br>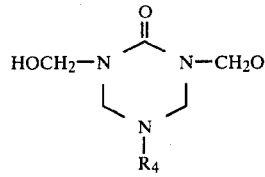 | N,N′—dimethylol-5-alkyl-hexahydro-1,3,5-triazin-2-one ($R_4 = C_{1-12}$ alkyl) |
| Urone derivatives<br>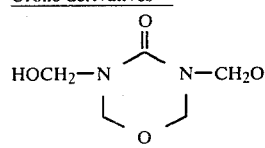 | N,N′—dimethylolurone |
| Carbamate derivatives<br>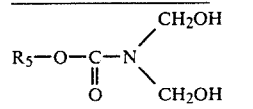 | alkyl N,N—dimethylol carbamates $R_5 = C_{1-4}$ alkyl, optionally monosubstituted with $C_{1-2}$ alkoxy or hydroxy |
| 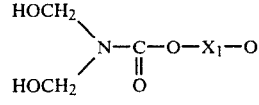 | alkylene tetra-methyl dicar-bamates ($X_1 = C_{1-4}$ alkylene) |
| 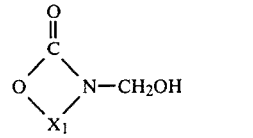 | N—methylol cyclic carbamates ($X_1$ is as defined above) |
| Amide derivatives<br>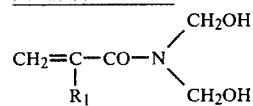 | N,N—dimethylol(meth)acryl-amide ($R_1$ is as defined above) |
| 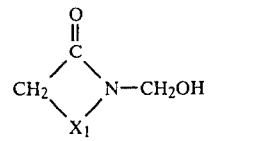 | N—methylol lactams ($X_1$ is as defined above) |

The preferred compounds are hydrolysis-resistant reactive resin precursors, for example N,N′-dimethylol-4,5-dihydroxy- or 4,5-dimethoxy-ethyleneurea and N,N′-dimethylol carbamates, optionally in etherified form. Preferred ether forms are the methyl and ethyl ether derivatives. Mixtures of compounds (B) may be used.

The intermediate product (B) is generally obtained in the form of an aqueous solution containing approx. 40–50% by weight of (B), and may be used as such in the reaction with (A), or may be further diluted with water.

The reaction between intermediate products (A) and (B) is carried out in an aqueous medium, for example by adding (A) in solid form or as an aqueous concentrate gradually to an aqueous solution of (B), preferably containing 30–50% (B) and 50–70% water by weight. The aqueous medium preferably has a pH between 4 and 6.

It is strongly preferred that the catalyst (C) be present during the reaction of (A) and (B), since it acts as a catalyst for this reaction as well as for the crosslinking of component (B). Suitably it is dissolved in the aqueous solution of (B) before addition of (A). However, if (A) and (B) can react together adequately in the absence of (C), then the catalyst (C) may be added to the reaction product subsequently.

(A) and (B) are reacted together, preferably with constant stirring, at room temperature or at temperatures of up to 80° C., preferably 60°–80° C. more preferably 70°–75° C. The condensation reaction should be stopped before the reaction product becomes water-insoluble or forms a gel; suitable reaction times are of the order of 30 minutes to 3 hours. The final product preferably has a viscosity at room temperature of 50–200 centipoise, more preferably 60–150 c.p. These viscosities apply to the reaction products as they are obtained i.e. including water in amount of 30–60% (by weight).

The relative amounts of components (A), (B) and (C), if present, fall within the limits 5–40 parts by weight (A), 25–110 parts by weight (B), 1–30 parts by weight (C), calculated on the basis of the active component present. Expressed as a weight ratio, the ratio of A:B:C is 1:0.625–22:0.025–6. Preferred ranges are 10–20 parts by weight (A), 35–75 parts by weight (B) and 5–15 parts by weight (C), or 1:1.75–7.5:0.25–1.5; more preferably 1:2–3:0.5–1.

The reaction product of (A) and (B) which preferably also contains catalyst (C), is stable for several days at room temperature. At slightly elevated temperatures or after long periods of storage (weeks or months) gel formation may occur, which is accompanied by a reduction of activity and which leads to difficulties in metering the product and applying it to a textile substrate.

It has been found that this problem may be overcome by the addition of from 1 to 10% (by weight based on the total of (A)+(B)) of DCDA, cyanamide, guanidine or biguanidine, preferably DCDA. This reagent may be added before, during or after the reaction of (A) with (B); preferably it is added before or during the reaction together with the catalyst (C), resulting in a reaction product which does not form a gel even on long storage, and which retains its full activity even after weeks or months.

The reaction product of (A) and (B) reacts with the -OH group of cellulose by means of the catalyst (C), which is known as such for the cross-linking of compounds of type (B) on cellulose. It is believed that there may also be cross-linking involving the dyestuff molecule.

Suitable catalysts are of Lewis acid type and include the nitrates, sulphates, chlorides, tetrafluoroborates and dihydrogen orthophosphates of aluminium, magnesium and zinc as well as aluminium hydroxychloride, zirconyl oxychloride, and mixtures of any of these. These catalysts may also be used in the form of mixtures with water soluble, inorganic salts, particularly with alkali metal sulphates or alkaline earth salts, preferably chlorides. Particularly preferred are sodium or potassium sulphate and calcium chloride. They may also be used in the form of mixtures with organic acids such as citric acid. Other suitable catalysts are (a) alkali metal bisulphites
(b) amine hydrochlorides, for example 2-amino-2-methylpropanol hydrochloride
(c) organic acids, for example citric, oxalic, maleic, glycollic and trichloroacetic acids
(d) inorganic acids, for example phosphoric and hydrochloric acids, alone or together with salts for example ammonium or calcium chloride,
and (e) ammonium salts of inorganic acids, for example ammonium nitrate, chloride, sulphate and oxalate, and mono- and di-ammonium orthophosphate.

Mixtures of any of these catalysts may be used.

Preferred catalysts are the nitrates, sulphates, chlorides and dihydrogen orthophosphates of aluminium, magnesium or zinc, more preferably of magnesium, particularly magnesium chloride, optionally together with an alkali metal sulphate, particularly sodium sulphate. The choice of the optimum catalyst system will however depend primarily upon the nature of component (B), and of the textile substrate, and the man skilled in the art will be aware from numerous publications which catalyst systems are preferred for specific resin precursors and substrates.

According to the process of the invention, a substrate comprising cellulose fibres and dyed or printed with a direct or reactive dye is treated with the product according to the invention in the presence of catalyst. The substrate may be dyed or printed by any methods conventionally used for direct or reactive dyes; for example dyeing may be carried out by exhaust dyeing from a dyebath, or by padding followed by a thermofixation or cold dwell fixation, or, in the case of reactive dyes, by alkaline fixation.

The process according to the invention is carried out upon a substrate on which the dyeing or printing process including any necessary fixation step, has been completed. The substrate may be dry, or may still be damp, provided that it is not so wet that it is incapable of further pick-up. The reaction product of (A) and (B), together with catalyst (C) is applied to the substrate in aqueous solution by dipping, spraying, foam application, padding or other conventional application techniques. The preferred application method is by padding.

The quantities in which the product according to the invention is applied to the substrate depend largely upon the depth of the dyeing which is to be fixed. For direct dyeings of 1/1 standard depth on cotton the quantities used are 30–200 g/l of the padding liquor when applied at a pick-up of 70–100% of the dry weight of the goods. Preferably the quantity is 70–130 g/l for cotton, and 100–200 g/l for regenerated cellulose. For application to mixtures of cellulose fibres and synthetic fibres, the quantity to be applied is calculated on the basis of the cellulose content of the substrate.

In the case of dyeings with reactive dyes, the quantity of product to be used will depend upon the amount of unfixed dyestuff remaining on the goods. By treatment of such dyeings with the process of the invention, the wash fastness of the residual unfixed reactive dye may be improved to the point where extensive washings to remove unfixed dye are no longer necessary.

The padding liquor may contain further auxiliaries such as stiffening agents, softening agents, agents to improve the rubbing or breaking strength, soil-release products, hydrophobic agents and others provided that these are capable of forming stable aqueous solutions when mixed with the product according to the invention.

After application of the padding liquor, the substrate is subjected to a heat curing step such as is conventional for resin treatments based on compounds of type (B).

The substrate may for example be dried at 70°–120° C. and finally cross-linked at a temperature of 130°–180° C. for 30 seconds to 8 minutes, or alternatively simultaneously dried and crosslinked by heat treatment at 120°–200° C., preferably 140°–180° C. for 5 seconds to 8 minutes depending on the temperature. A preferred process involves heating the padded substrate to 170°–180° C. for 30 seconds to 1 minute.

The process of the invention is preferably carried out upon substrates dyed with direct dyes, of which metal complex dyes, particularly copper complex dyes, are preferred.

A method to determine the suitability of a dyestuff for the inventive process consists in the determination of the $R_f$ value of a given dyestuff. As an example, particularly good results are obtained with the reaction product of DCDA/diethylenetriamine and dimethyloldihydroxyethyleneurea (as described in Example 1) and with those direct dyestuffs which at room temperature have an $R_f$ value, measured as described below, of not more than 0.35. The $R_f$ value as used in this case is determined by thin-layer chromatography on 0.25 mm silica gel plates developed with a freshly-prepared mixture of methyl ethyl ketone, diethylamine and concentrated aqueous ammonia (3:1:1 by weight), using Polygram SIL g/UV 254 as fluorescence indicator. The dyestuffs may be tested in their normal commercial form.

Two classes of exceptions to the above general rule are shown by copper complex dyes having 3 or 4 -SO₃H groups per molecule. Such complexes containing 2 Cu atoms per molecule give particularly good results even where the $R_f$ value is between 0.35 and 0.8. On the other hand, such complexes containing 1 Cu atom per molecule and having a molecular weight of less than 900 do not give such good results, even if the $R_f$ value is 0.35 or less.

A further test method more generally applicable to determine which group of treatment agents according to the invention is best suited for a given direct dye (or vice versa) consists in mixing together the dye and the intermediate product (A). If the dye and (A) form a precipitate, which after washing, does not redissolve in alkali at pH 12, then particularly good results may be expected from the post-treatment of dyeings made with that dye with a treatment agent derived from that intermediate product (A).

Both of the above tests are rapid and simple to carry out, and are useful for the dyeing technician to determine which dyes, or which combinations of dye and treatment agent, will give the best results.

Formulae II–XIII are examples of particularly suitable dyestuffs in connection with which the process of the present invention may be used:

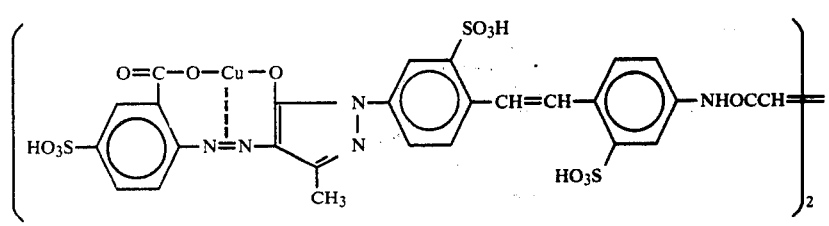

II

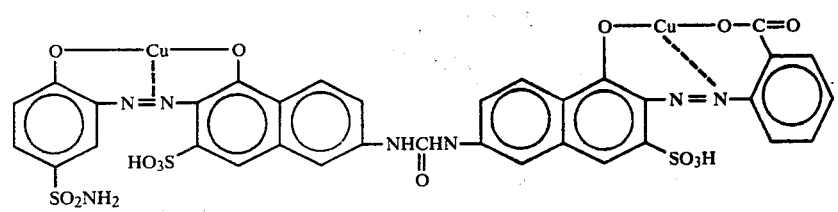

III

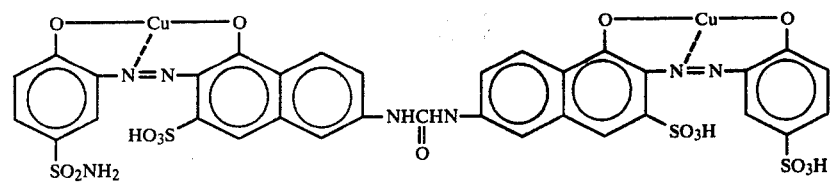

IV

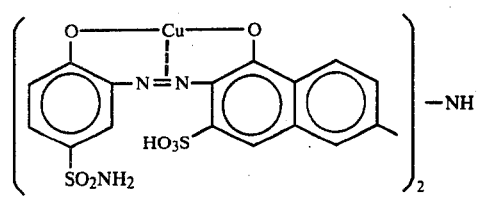

V

-continued
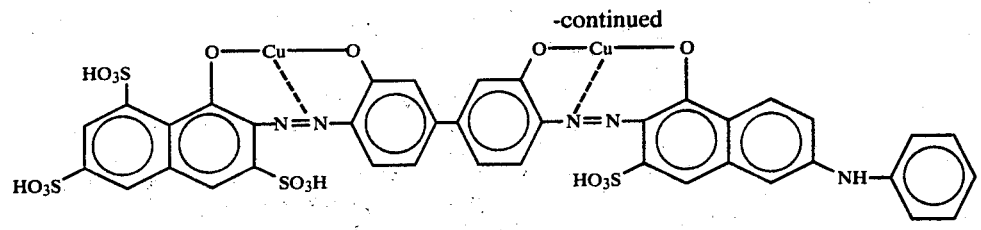
VI
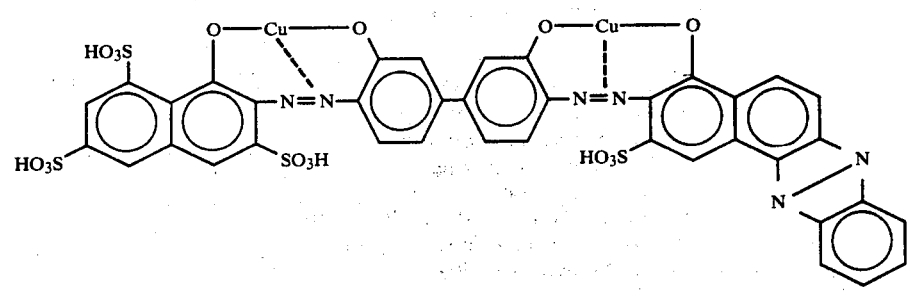
VII
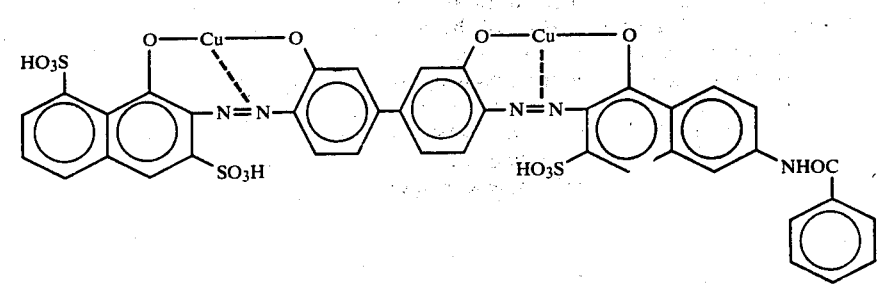
VIII
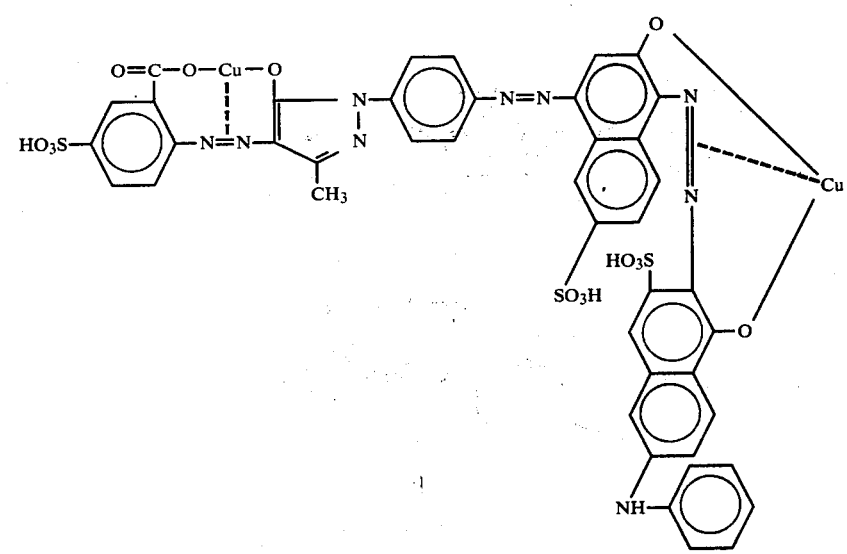
IX
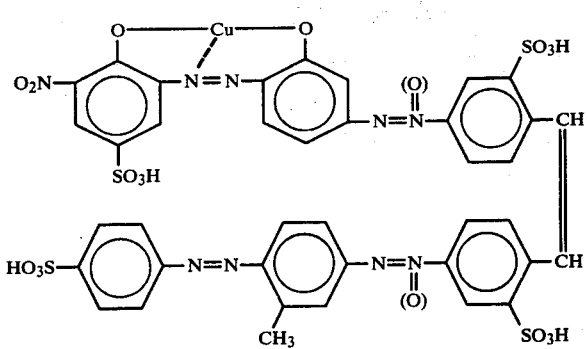
X

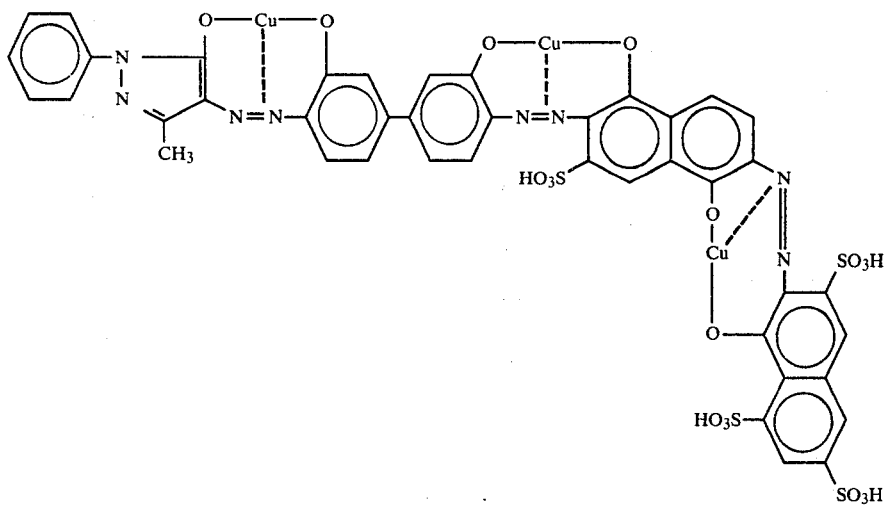

XI

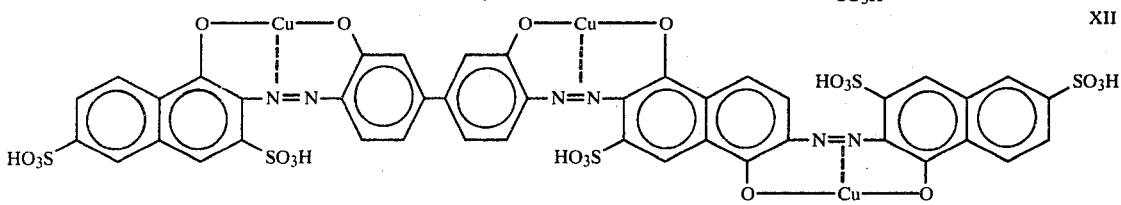

XII

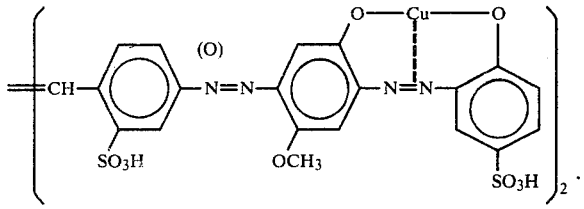

XIII

Treatment of dyed cellulose textile substrates according to the invention gives improved wet fastness properties, particularly fastness to washing, including washing under alkaline conditions at temperatures of 40°–80° C., particularly at 60° C. and above. For example, repeated 30 minute 60° C. washings with a wash liquor containing 5 g/l soap and 2 g/l soda at a goods to liquor ratio of 1:50 are readily withstood. The dyeings also have excellent light fastness.

In the case of dyeings with reactive dyes, the wash fastness of the unfixed dye may be raised to approximately the same level as that of the fixed dye, thereby eliminating the need to remove the unfixed dye. The fastness properties of the fixed reactive dye, for example to chlorine and perborate may also be improved.

At the same time a resin finish is imparted to the cellulose fibres which gives reduced swelling in aqueous or alkaline media and hence more rapid drying, improved dimensional stability and higher crease resistance.

The following Examples, in which all parts and percentages are by weight and all temperatures in degrees Centigrade, illustrate the invention.

EXAMPLE 1

103 Parts diethylene triamine and 84 parts DCDA are heated at 110°. As soon as this temperature is reached an exothermic reaction takes place and ammonia escapes. The temperature is slowly raised to 160° and kept there for about 6 hours until no more ammonia is released. The amount of ammonia is about 34 parts. The liquid reaction product is poured onto a flat metal pan and ground to a powder after it is cold.

69.3 Parts of this powder is added slowly to 81 parts water at 35° stirring constantly. Then 53.4 parts of 44.6% sulphuric acid are added simultaneously with 45.0 parts of ice so that the temperature does not rise above 48°–50°. Afterwards a further 69.3 parts of the powder are added, and once again neutralized with 78.8 parts of 44.6% sulphuric acid and 45.0 parts of ice so that the temperature stays under 50°. The yellow solution which has a pH of 7.5 is then spray-dried, to give a white powder. (Product A)

18.3 Parts DCDA and 362.6 parts of a 50% solution of dimethyloldihydroxyethyleneurea are stirred together and diluted with 147.2 parts water. 54.3 Parts magnesium chloride hexahydrate are added, then 72.6 parts of the spray dried product (A), and the mixture is stirred at 30° until all solids have dissolved to give a solution of approx. pH 4.5. The mixture is then heated to 70° over 45 min., held for 1½ hours at 70°–74° and cooled to give a clear stable yellow solution, which can be used as an after-treatment agent to improve the wet fastness properties of dyeings and printings of direct and reactive dyes on cellulose.

EXAMPLE 2

146 Parts triethylene tetramine and 84 parts DCDA are slowly heated with stirring to 100°–110°. Ammonia is evolved and the temperature rises to 140°. After evolution of ammonia has ended, the product is allowed to react for 14–16 hours at this temperature. The resulting mass is allowed to cool and then ground to a powder, which is neutralized with sulphuric acid and dried as described in Example 1.

100 Parts of a 50% aqueous solution of dimethyloldihydroxyethyleneurea are warmed to 70°–80°, then 20 parts of magnesium chloride hexahydrate are added with continuous stirring. To the resulting clear solution at 70° is added portionwise 30 parts of the above reaction product, stirring until all has dissolved. The reaction mixture is stirred for a further 2–3 hours, giving a clear yellow liquid which may be further diluted with water, and which may be used directly or after further dilution for the fixation of dyeings with direct dyes on cellulose, or for improving dyeings with reactive dyes on cellulose.

EXAMPLE 3

Example 2 is repeated, except that 5 parts DCDA are added to the 50% dimethyloldihydroxyethyleneurea solution either together with or after the magnesium chloride and allowed to react 2–3 hours at 70° before the reaction product of DCDA and triethylene tetramine is added. The resulting product has improved stability on storage.

EXAMPLE 4

A mixture of 175.5 parts 3-(2-aminoethyl)-aminopropylamine and 84 parts DCDA is reacted for 6 hours at 120°, about 33 parts of ammonia being evolved. The resulting condensation product is finally cooled and diluted with 227 parts water.

50 Parts of the resulting suspension are neutralized with 11.5 parts 96% sulphuric acid and finally treated with a mixture of 100 parts 50% aqueous dimethyloldihydroxyethyleneurea and 15 parts $MgCl_2.6H_2O$ for 2 hours at 65°. A clear solution is obtained, which may be used directly or after dilution.

EXAMPLE 5

A mixture of 120 parts ethylene diamine and 84 parts DCDA is condensed for 6 hours at 115°, 34 parts ammonia being evolved. The resulting condensation product is finally treated with 170 parts of water.

50 Parts of the resulting suspension are neutralized with 14.8 parts of 90% sulphuric acid. After addition of 15 parts $MgCl_2.6H_2O$ and 100 parts of a 50% aqueous solution of dimethyloldihydroxyethyleneurea the mixture is allowed to react for 1 hour at 70°. A cloudy water-miscible liquid is obtained which may be used as such.

EXAMPLE 6

120 Parts of a polyethylene amine with an average molecular weight of 1200 are reacted with 84 parts DCDA for 2 hours at 130°. Ammonia is evolved and a viscous blue oil is obtained.

100 Parts of a 50% aqueous solution of dimethyloldihydroxyethyleneurea are treated at room temperature with 15 parts $MgCl_2.6H_2O$ and finally with 25 parts of the above condensation product. The reaction is exothermic and the temperature rises from room temperature to about 40°. When the exothermic reaction has ended the temperature is maintained at 40° for 1 hour. A clear yellow liquid is obtained which may be used as such or after further dilution.

EXAMPLE 7

A mixture of 189 parts tetraethylene pentamine and 84 parts DCDA are reacted for 5 hours at 160°. After this time ammonia is no longer evolved and a light yellow solid condensation product is obtained which is cooled to room temperature and ground to a powder.

25 Parts of this condensation product are reacted for 1 hour at 60° with 100 parts of a 50% aqueous solution of trimethylolmelamine. A pourable viscous water-soluble dispersion is obtained which after addition of a suitable catalyst may be used as such or after dilution.

EXAMPLE 8

25 Parts of the DCDA/tetraethylene pentamine condensation product obtained according to Example 7 are dissolved in 200 parts of water and neutralized with 35% aqueous hydrochloric acid. The solution is concentrated at 50° and 25 torr until 110 parts of the neutralized concentrate remain. This is then reacted at 50° for 2 hours with 100 parts of an 80% aqueous solution of hexamethylolmelamine. A cloudy water-soluble liquid is obtained which may be used without dilution after addition of a suitable catalyst.

EXAMPLE 9

65 Parts of a neutralized solution of the condensation product of diethylene triamine/DCDA obtained according to Example 1 are diluted with 55 parts water and finally treated with 100 parts of a 50% aqueous trimethylolmelamine solution for 2 hours at 30°. A cloudy water-soluble liquid is obtained which may be used without dilution after addition of a suitable catalyst.

EXAMPLE 10

66 Parts diethylene triamine carbonate (obtained as crystals by the introduction of carbon dioxide into an alcoholic solution of diethylenetriamine) are melted and mixed with 33.6 parts DCDA in a closed vessel fitted with stirring gear. The mixture is heated to 140°–160° for 6 hours, whereby the mass becomes continuously thicker until it is finally hardly capable of being stirred. It is allowed to cool and the solidified bubble-containing product is powdered.

30 Parts of this solid product are reacted with 100 parts of a 50% aqueous solution containing 25 parts of dimethylolurone and 25 parts dimethyloldihydroxyethyleneurea and 20 parts of $MgCl_2.6H_2O$ according to the conditions of Example 2. A reaction product similar to that of Example 2 is obtained.

EXAMPLE 11

A mixture of 51.5 parts diethylene triamine and 45 parts guanidine carbonate is stirred and heated to 130°. Ammonia is evolved and the temperature is raised to 140°–150° and held there for 5 hours. On cooling, the product solidifies and is ground to a powder.

30 Parts of this product are used in place of the triethylene tetramine/DCDA product of Example 2, and a reaction product similar to that of Example 2 is obtained.

EXAMPLE 12

103 Parts diethylene triamine and 42 parts cyanamide are heated together at 110°–140° for 6 hours and the solid product neutralized with sulphuric acid and dried.

30 Parts of this product are used in place of the triethylene tetramine/DCDA product of Example 2, and a reaction product similar to that of Example 2 is obtained.

EXAMPLE 13

A cotton fabric dyed with a 1/1 standard depth dyeing of the dyestuff of formula VII is padded with an aqueous solution containing 100 g/l of the product of Example 1 and squeezed out to give a pick-up of about 80%. The fabric is then shock-dried on a tension frame at 175°–180° in such a way that the crosslinking time of the dry fabric is 30–45 seconds at this temperature.

The fixed dyeing exhibits excellent wash-fastness, and withstands repeated 60° washes and even a wash at the boil. At the same time a clear improvement of crease resistance is obtained, and the swelling value of the cellulose fibres is reduced.

EXAMPLE 14

A dyeing with 3% of the dyestuff of formula VIII on cotton is treated with 80 g/l of a solution of the product of Example 2, as described in Example 13. An excellent wash fastness, together with improved crease resistance, is obtained.

EXAMPLE 15

A dyeing with 2.4% of the dyestuff of formula V on cotton is treated as described in Example 13 using the treatment agent described in Example 10. Generally improved wet fastness properties are obtained, allowing repeated washing at high temperatures.

EXAMPLES 16–22

A rinsed and dried exhaust dyed cotton fabric dyed to 1/1 standard depth with the dyestuff of column I of the table below, is padded at 80% pick-up with a solution containing x g/l of a product according to the invention and y g/l of magnesium chloride hexahydrate, where x and y are as shown in columns II and III respectively. The nature of the product is shown in column IV. The padded fabric is cured as described in Example 13, and gives excellent wash fastnesses at 95°.

TABLE

| Example No. | I Dyestuff of formula | II x g/l product | III y g/l MgCl$_2$.6H$_2$O | IV product of Example |
|---|---|---|---|---|
| 16 | VIII | 180 | — | 3 |
| 17 | XII | 150 | — | 4 |
| 18 | XII | 150 | — | 5 |
| 19 | XII | 130 | — | 6 |
| 20 | XII | 125 | 15 | 7 |
| 21 | XII | 200 | 15 | 8 |
| 22 | IX | 200 | 15 | 9 |

In Examples 13–22, all dyestuffs are used in their commercial form.

EXAMPLE 23

A cotton fabric is dyed with C.I. Reactive Violet 23 to a standard depth of 2/2, using a conventional dyeing process for reactive dyes, without a final washing step.

The dyed fabric is dried and then padded with a solution of 130 g/l of the product of Example 1 at a pick-up of approx. 80% of the dry weight. The padding liquor also contains 10 g/l of a conventional anionic softener, 20 g/l of a polyethylene dispersion and 1 g/l of a conventional non-ionic surfactant.

The treated fabric is dried to a residual moisture content of 2–4%, then cured at 180° for 30–45 seconds. The resulting dyeing shows a high level of wash fastness in spite of the fact that no washing step is carried out after dyeing with the reactive dyestuff. Simultaneously a clear improvement in crease resistance is obtained.

EXAMPLE 24

A cotton fabric is dyed with C.I. Reactive Red 118 using a conventional dyeing process for reactive dyes. After dyeing and fixing, the fabric is briefly rinsed and neutralized, without washing at the boil.

The dyeing is treated with a solution containing 130 g/l of the product of Example 1, as described in Example 13. Excellent wash fastness properties are obtained.

What is claimed is:

1. A water-soluble product obtained by reacting together
   (A) the product of reacting a mono- or polyfunctional primary or secondary amine in free base or salt form with cyanamide, dicyanodiamide, guanidine or biguanidine; said product containing reactive hydrogen atoms bound to nitrogen,
   and (B) an N-methylol derivative of a urea, melamine, guanamine, triazinone, urone, carbamate or acid amide in aqueous solution.

2. A product according to claim 1 obtained by reacting together reactants (A) and (B) in aqueous solution in the presence of (C) a catalyst for the crosslinking of N-methylol compounds of the type (B).

3. A product according to claim 2 in which catalyst (C) is selected from nitrates sulphates, chlorides and dihydrogen orthophosphates of aluminium, magnesium and zinc.

4. A product according to claim 3 in which the catalyst (C) is magnesium chloride.

5. A product according to claim 1 in which reactant (B) is N,N'-dimethylol-4,5-dihydroxyethyleneurea, N,N'-dimethylol-4,5-dimethoxyethyleneurea, an N,N'-dimethylol carbamate, or a lower alkyl ether thereof.

6. A product according to claim 1 obtained by reacting together (A) the product of reacting diethylene triamine or triethylene tetramine with dicyanodiamide and (B) N,N'-dimethylol-4,5-dihydroxyethyleneurea in the presence of (C) magnesium chloride.

7. A product according to claim 1 stabilized against gel formation on storage by the addition of from 1 to 10% by weight of dicyanodiamide, cyanamide, guanidine or biguanidine before, during or after the reaction of (A) with (B).

8. A product according to claim 1 in which reactant (A) is the reaction product of a monofunctional amine of formula Ia $$RRNH \qquad \text{Ia}$$

in which each R is as defined below, provided that at least one is other than hydrogen, or a polyfunctional amine of formula Ib $$RRN-(Z-X)_n-Z-NRR \qquad \text{Ib}$$

in which each
   R independently is hydrogen or a C$_{1-10}$alkyl group unsubstituted or monosubstituted with hydroxy, C$_{1-4}$alkoxy or cyano,
   n is a number from 0 to 100

Z, or each Z independently when n>0, is $C_{1-4}$alkylene or hydroxyalkylene
and X, or each X independently when n>1, is —O—, —S— or —NR— where R is as defined above,
provided that the amine of formula Ib contains at least one reactive —NH— or —NH$_2$ group, with cyanamide, dicyanodiamide or guanidine.

9. A product according to claim 8 in which reactant (A) is the reaction product of a polyfunctional amine of formula Ib with cyanamide, dicyanodiamide or guanidine.

10. A product according to claim 9 in which, in the polyfunctional amine of formula Ib, R is hydrogen or $C_{1-4}$alkyl or hydroxyalkyl, n is a number from 0 to 30, Z is 1,2-ethylene, 1,3-propylene or 1,3-(2-hydroxypropylene) and X is —NR—.

11. A product according to claim 10 in which, in the polyfunctional amine of formula Ib, R is hydrogen and n is an integer from 1 to 6.

12. A product according to claim 10 in which reactant (B) is N,N'-dimethylol-4,5-dihydroxyethyleneurea, N,N'-dimethylol-4,5-dimethoxyethyleneurea, an N,N'-dimethylol carbamate; or a lower alkyl ether of said compounds.

13. A product according to claim 12 which is obtained by reacting (A) and (B) in aqueous solution in the presence of (C) a catalyst suitable for crosslinking N-methylol compounds (B) and selected from the nitrates, sulphates, chlorides and dihydrogen orthophosphates of aluminum, magnesium and zinc.

14. A product according to claim 13 which is obtained from (A), (B) and (C) in relative amounts of 5-40 parts by weight, 25-110 parts by weight and 1-30 parts by weight, respectively.

15. A product according to claim 10 in which reactant (A) is the reaction product of a polyfunctional amine of formula Ib with dicyanodiamide.

16. A product according to claim 15 in which reactant (A) is the product of reacting the dicyanodiamide and the amine in a molar ratio of 2:1 to 1:2.

17. A product according to claim 8 in which reactant (A) is the product of the reaction of 0.1 to 1 mole of cyanamide, dicyanodiamide, guanidine or biguanidine per mole of reactive —NH or —NH$_2$ group in the amine.

18. A product according to claim 17 in which reactant (B) is N,N'-dimethylol-4,5-dihydroxyethyleneurea, N,N'-dimethylol-4,5-dimethoxyethyleneurea, an N,N'-dimethylol carbamate; or a lower alkyl ether of said compounds.

19. A product according to claim 8, which has a viscosity of 50 to 200 centipoises at room temperature in the presence of water in an amount of 30 to 50% by weight.

20. A product according to claim 8, in which reactants (A) and (B) are in relative amounts of 5-40 parts by weight and 25-110 parts by weight, respectively.

21. A product according to claim 20 in which reactants (A) and (B) are in relative amounts of 5-40 parts by weight and 25-110 parts by weight, respectively.

22. A product according to claim 21 stabilized against gel formation on storage by the addition of from 1 to 10% by weight of dicyanodiamide, cyanamide, guanidine or biguanidine before, during or after the reaction of (A) and (B).

23. A product according to claim 5 in which reactant (B) is N,N'-dimethylol-4,5-dihydroxyethyleneurea, N,N'-dimethylol-4,5-dimethoxyethyleneurea, an N,N'-dimethylol carbamate, or a lower alkyl ether thereof, the reactants (A) and (B) being reacted in aqueous solution in the presence of (C) a catalyst suitable for crosslinking of N-methylol compounds (B) and selected from nitrates, sulphates, chlorides and dihydrogen orthophosphates of aluminum, magnesium and zinc.

24. A product according to claim 23 which is obtained from (A), (B) and (C) in relative amounts of 5-40 parts by weight, 25-110 parts by weight and 1-30 parts by weight, respectively.

25. A product according to claim 8 wherein reactant (B) is selected from the group consisting of N,N'-dimethylolurea; N,N'-dimethylolethyleneurea; N,N'-dimethylolpropyleneurea; N,N'-dimethylol-4,5-dihydroxyethyleneurea; N,N'-dimethylol-4,5-dimethoxyethyleneurea; N,N'-dimethylol-5-hydroxypropyleneurea; N,N'-dimethylol-5-methylpropyleneurea; N,N'-dimethylol-5,5-dimethylpropyleneurea; N,N'-dimethylol-4-hydroxy-5,5-dimethylpropyleneurea; N,N'-dimethylol-4-methoxy-5,5-dimethylpropyleneurea; N,N,N',N'-tetramethylolacetylenediurea; mono- or polymethylol melamine; mono- or polymethylol $C_{1-12}$ alkyl or $C_{6-12}$ arylguanamine; N,N'-dimethylol-5-$C_{1-12}$alkylhexahydro-1,3,5-triazin-2-one; N,N'-dimethylololurone; $C_{1-4}$alkyl-, $C_{1-2}$alkoxy-$C_{1-4}$alkyl- or hydroxy $C_{1-4}$alkyl N,N'-dimethylol carbamates; $C_{1-4}$ alkylene tetramethyl dicarbamates; N-methylol $C_{1-4}$ alkylene cyclic carbamates; N,N'-dimethylol acrylamide; N,N'-dimethylol methacrylamide; N-methylol $C_{1-5}$alkylene cyclic lactams; and lower alkyl ethers of said compounds.

26. A product according to claim 25 which is obtained by reacting (A) and (B) in aqueous solution in the presence of (C) a catalyst suitable for crosslinking N-methylol compounds (B) and selected from the nitrates, sulphates, chlorides and dihydrogen orthophosphates of aluminum, magnesium and zinc.

* * * * *